(12) United States Patent
Collazo (10) Patent No.: US 7,379,994 B2
(45) Date of Patent: May 27, 2008

(54) AGGREGATE SYSTEM RESOURCE ANALYSIS INCLUDING CORRELATION MATRIX AND METRIC-BASED ANALYSIS

(75) Inventor: Carlos M. Collazo, Redwood Shores, CA (US)

(73) Assignee: MetiLinx, San Mateo, CA (US)

( * ) Notice: Subject to any disclaimer, the term of this patent is extended or adjusted under 35 U.S.C. 154(b) by 550 days.

(21) Appl. No.: 10/040,012

(22) Filed: Oct. 26, 2001

(65) Prior Publication Data

US 2002/0152304 A1    Oct. 17, 2002

Related U.S. Application Data (60) Provisional application No. 60/243,783, filed on Oct. 26, 2000.

(51) Int. Cl.
   *G06F 15/173*    (2006.01)
(52) U.S. Cl. .................. 709/224; 709/226; 702/182
(58) Field of Classification Search ........ 709/224–225, 709/223; 702/182, 186
   See application file for complete search history.

(56) References Cited

U.S. PATENT DOCUMENTS

| | | |
|---|---|---|
| 5,459,837 A | 10/1995 | Caccavale |
| 5,819,028 A | 10/1998 | Manghirmalani et al. |
| 6,000,045 A | 12/1999 | Lewis |
| 6,088,330 A | 7/2000 | Bruck et al. |
| 6,108,782 A | 8/2000 | Fletcher et al. |
| 6,128,277 A | 10/2000 | Bruck et al. |
| 6,185,619 B1 | 2/2001 | Joffe et al. |
| 6,205,477 B1 * | 3/2001 | Johnson et al. ............. 709/220 |
| 6,215,772 B1 | 4/2001 | Verma |
| 6,269,401 B1 | 7/2001 | Fletcher et al. |
| 6,377,907 B1 * | 4/2002 | Waclawski ................... 702/182 |
| 6,513,065 B1 * | 1/2003 | Hafez et al. ................. 709/224 |
| 6,611,867 B1 * | 8/2003 | Bowman-Amuah ......... 709/224 |
| 6,622,157 B1 * | 9/2003 | Heddaya et al. ............ 709/202 |
| 6,647,412 B1 * | 11/2003 | Strandberg et al. ......... 709/223 |
| 6,691,067 B1 * | 2/2004 | Ding et al. ................. 702/186 |
| 6,738,813 B1 * | 5/2004 | Reichman ................... 709/224 |

(Continued)

FOREIGN PATENT DOCUMENTS

EP    0 849 912 A2    8/1997

(Continued)

OTHER PUBLICATIONS

Buyya, R. "PARMON: a portable and scalable monitoring system for clusters," Software-Practice and Experience, 2000, vol. 30, pp. 723-739.

*Primary Examiner*—William Vaughn
*Assistant Examiner*—Greg Bengzon
(74) *Attorney, Agent, or Firm*—Townsend and Townsend and Crew LLP (57) ABSTRACT

A system for gathering data for purposes of analyzing a network. The data is gathered based on values that are passed from node-to-node within processing devices, such as servers, in a network. The values are generated from characteristics obtained from measuring device performance and resource utilization. Values are passed peer-to-peer and successively combined with values at each receiving system so that, ultimately, a value is obtained that reflects the operation of a group of devices. A correlation matrix is maintained to indicate discrepancies in value meanings from different devices. The correlation matrix is used to more accurately combine values to achieve meaningful composite values.

7 Claims, 4 Drawing Sheets

U.S. PATENT DOCUMENTS

| | | |
|---|---|---|
| 6,748,416 B2 * | 6/2004 | Carpenter et al. .......... 709/202 |
| 6,807,580 B2 * | 10/2004 | Freeman et al. ............ 709/249 |
| 2002/0002613 A1 * | 1/2002 | Freeman et al. ............ 709/225 |
| 2002/0073226 A1 * | 6/2002 | Sridhar et al. .............. 709/235 |
| 2002/0133593 A1 * | 9/2002 | Johnson et al. ............. 709/226 |
| 2003/0046396 A1 * | 3/2003 | Richter et al. .............. 709/226 |
| 2003/0147386 A1 | 8/2003 | Zhang et al. |
| 2003/0154284 A1 * | 8/2003 | Bernardin et al. .......... 709/226 |
| 2004/0103139 A1 * | 5/2004 | Hubbard et al. ............ 709/201 |
| 2004/0210632 A1 * | 10/2004 | Carlson et al. ............. 709/203 |
| 2007/0005330 A9 * | 1/2007 | Hardwick et al. ............ 703/22 |

FOREIGN PATENT DOCUMENTS

| | | |
|---|---|---|
| EP | 0 940 754 A1 | 9/1999 |
| WO | WO 01/25887 A1 | 4/2001 |

* cited by examiner

Prior Art

Fig. 2C

AGGREGATE SYSTEM RESOURCE ANALYSIS INCLUDING CORRELATION MATRIX AND METRIC-BASED ANALYSIS

CLAIM OF PRIORITY

This application claims priority from U.S. Provisional Patent Application No. 60/243,783, filed Oct. 26, 2000.

CROSS-REFERENCES TO RELATED APPLICATIONS

This application is related to the following co-pending applications, each of which is incorporated by reference as if set forth in full in this application:

U.S. Patent Application entitled "System-Wide Optimization Integration Model" filed on Oct. 12, 2001, Ser. No. 09/976,368; U.S. Patent Application entitled "Multi-Platform Optimization Model" filed on Oct. 12, 2001, Ser. No. 09/976,518; and, U.S. Patent Application entitled "Application Program Interface for Optimization Model" filed on Oct. 26, 2001, Ser. No. 10/055,404.

BACKGROUND OF THE INVENTION

Digital computer networks, such as the Internet, are now used extensively in many aspects of commerce, education, research and entertainment. Because of the need to handle high volumes of traffic, many Internet sites are designed using several groups of server computers. An example of a site network system is shown in FIG. 1A.

Figure 1A:
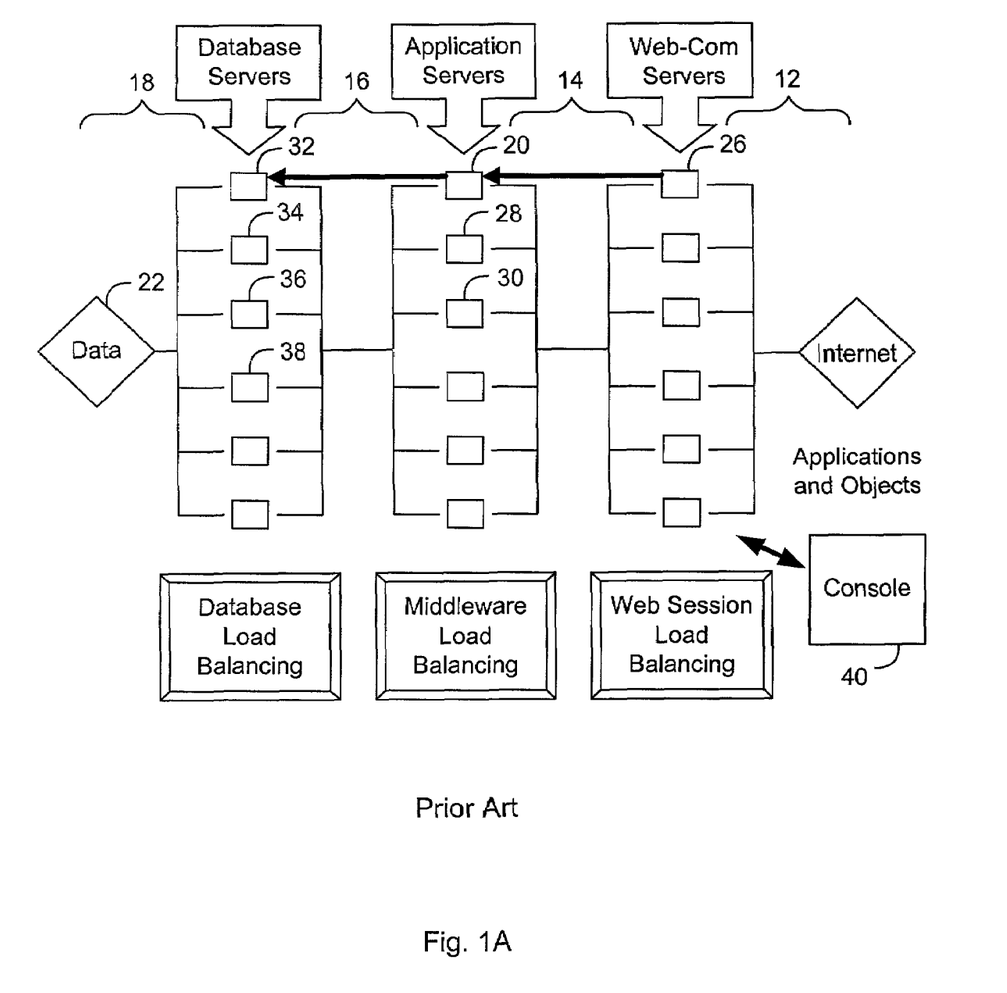
FIG. 1A shows network performance measured in a prior art system.

In FIG. 1A, network system 10 includes four major tiers. These are communications tier 12, web tier 14, application tier 16 and database tier 18. Each tier represents an interface between a group of server computers or other processing, storage or communication systems. Each interface handles communication between two groups of server computers. Note that the tiers are significant in that they represent the communication protocols, routing, traffic control and other features relating to transfer of information between the groups of server computers. As is known in the art, software and hardware is used to perform the communication function represented by each tier.

Server computers are illustrated by boxes such as 20. Database 22 and Internet 24 are represented symbolically and can contain any number of servers, processing systems or other devices. A server in a group typically communicates with one or more computers in adjacent groups as defined and controlled by the tier between the groups. For example, a request for information (e.g., records from a database) is received from the Internet and is directed to server computer 26 in the Web-Com Servers group. The communication takes place in communications tier 12.

Server computer 26 may require processing by multiple computers in the Application Servers group such as computers 20, 28 and 30. Such a request for processing is transferred over web tier 14. Next, the requested computers in the Application Servers group may invoke computers 32, 34, 36 and 38 in the Database Servers group via application tier 16. Finally, the invoked computers make requests of database 22 via database tier 18. The returned records are propagated back through the tiers and servers to Internet 24 to fulfill the request for information.

Of particular concern in today's large and complex network systems is monitoring the performance of, and optimizing, the system. One way that prior art approaches monitor system performance is to use a process at certain points in the network to report data back to a central location such as console 40. In FIG. 1A, the request for database records can be monitored by having a process at server 26 log the time and nature of the request. A process at server 20 then logs the time at which a request from server 26 is received. Similarly, server 32 (or whichever server receives the database request from server 20) logs its participation in the transaction. This "chain" of logged transactions is illustrated by bold arrows in FIG. 1A.

In this manner, the prior art monitoring system can determine how long it takes for a request for a record to propagate through the network. The transaction can also be tracked in the other direction to determine how long it takes to fulfill the request. The nature of such data logging is complex since a server in one tier, or group, may ask multiple other servers for assistance, or processing. Also, different servers can be asked at different points in time. The speed at which requests, processing and transactions occur can cause large amounts of data to be logged very rapidly. At some later time, the data is transferred to console 40. Console 40 acts to resolve the data and produce meaningful results about system performance that can be analyzed by a human administrator.

A problem with the prior art approach is that the logging processes are segregated and do little, if any, communication with each other. This means that complex dependencies among processes, servers, etc., are not accurately analyzed. The logging processes tend to create high overhead in the host servers in which they execute. One approach uses the console to poll the processes. Frequent polling of many processes also creates excessive overhead. Optimization and performance improvement based on the prior art approach is hampered by the use of disparate platforms and the lack of more encompassing analysis. Having to dump data to the console at intervals, and then have the data resolved, ultimately means that monitoring is not performed in real time.

Thus, it is desirable to provide a system that improves upon one or more shortcomings in the prior art.

BRIEF SUMMARY OF THE INVENTION

The invention provides a system for gathering data for purposes of analyzing a network. The data is gathered based on values that are passed from node-to-node within processing devices, such as servers, in a network. The values are generated from characteristics obtained from measuring device performance and resource utilization. Values are passed peer-to-peer and successively combined with values at each receiving system so that, ultimately, a value is obtained that reflects the operation of a group of devices. A correlation matrix is maintained to indicate discrepancies in value meanings from different devices. The correlation matrix is used to more accurately combine values to achieve meaningful composite values.

In one embodiment the invention provides a method for collecting information about a network's operation, wherein the network includes a plurality of devices, the method comprising using peer-to-peer communication among a plurality of devices in the network to obtain a measure of the network performance.

DETAILED DESCRIPTION OF THE INVENTION

A preferred embodiment of the present invention is incorporated into products, documentation and other systems and materials created and distributed by MetiLinx, Inc. as a suite of products referred to as "Metilinx iSystem Enterprise" system. The Metilinx system is designed to monitor and optimize digital networks, especially networks of many computer servers in large Internet applications such as technical support centers, web page servers, database access, etc.

The system of the present invention uses software mechanisms called "intelligence objects" (IOs) executing on the various servers, computers, or other processing platforms, in a network. The intelligence objects are used to obtain information on the performance of a process or processes, hardware operation, resource usage, or other factors affecting network performance. Values are passed among the intelligence objects so that a composite value that indicates the performance of a greater portion of the network can be derived.

Figure 2A:
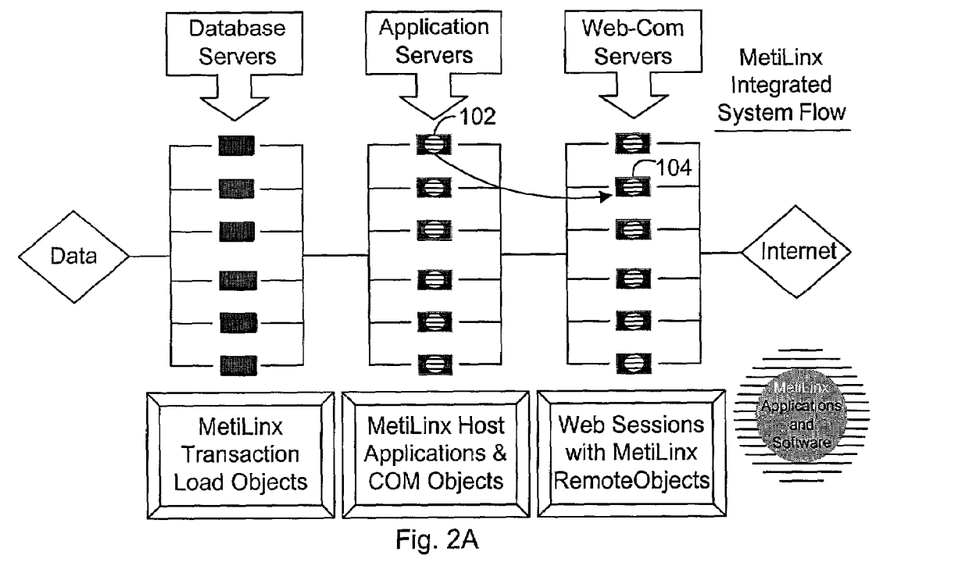
FIG. 2A shows intelligence objects and performance value passing in the present invention.

FIG. 2A illustrates intelligence objects and value passing. In FIG. 2A, intelligence objects such as 102 and 104 reside in computer servers. Any number of intelligence objects can reside in a server computer and any number of server computers in the n-tiered system can be equipped with one or more intelligence objects. A first type of intelligence object is a software process called a system level object (SLO) that can monitor and report on one or more aspects of other processes or hardware operating in its host computer server. A second type of intelligence object, called a transaction level object (TLO) is designed to monitor transaction load with respect to its host computer or processes executing within the host computer.

In one embodiment, IO 102 measures a performance characteristic of its host computer and represents the characteristic as a binary value. This value is referred to as the "local" utilization value since it is a measure of only the host computer, or of transaction information relating to the host computer. The local utilization value is passed to IO 104. IO 104 can modify the passed value to include a measurement of its own host computer. The modified value is referred to as a "composite" utilization value. The composite utilization value can, in turn, be passed on to other intelligence objects that continue to build on, or add to, the measurements so that performance across multiple computer, tiers, operating systems, applications, etc., is achieved.

Ultimately, the utilization value, or values, is passed on to other processes which can display the result of the combined measurements to a human user, use the result to derive other results, use the result to automate optimization of the n-tiered system, or use the result for other purposes. One aspect of the invention provides for redirecting processes and interconnections on the network based on the assessed utilization values of the computers, or nodes, in order to improve, or optimize, network performance. The processes that perform the redirection are referred to as "process redirection objects."

Note that although the invention is sometimes discussed with respect to a multi-tiered server arrangement that any arrangement of servers, computers, digital processors, etc., is possible. The term "processing device" is used to refer to any hardware capable of performing a function on data. Processing devices include servers, computers, digital processors, storage devices, network devices, input/output devices, etc. Networks need not be in a multi-tiered arrangement of processing devices but can use any arrangement, topology, interconnection, etc. Any type of physical or logical organization of a network is adaptable for use with the present invention.

Figure 2B:
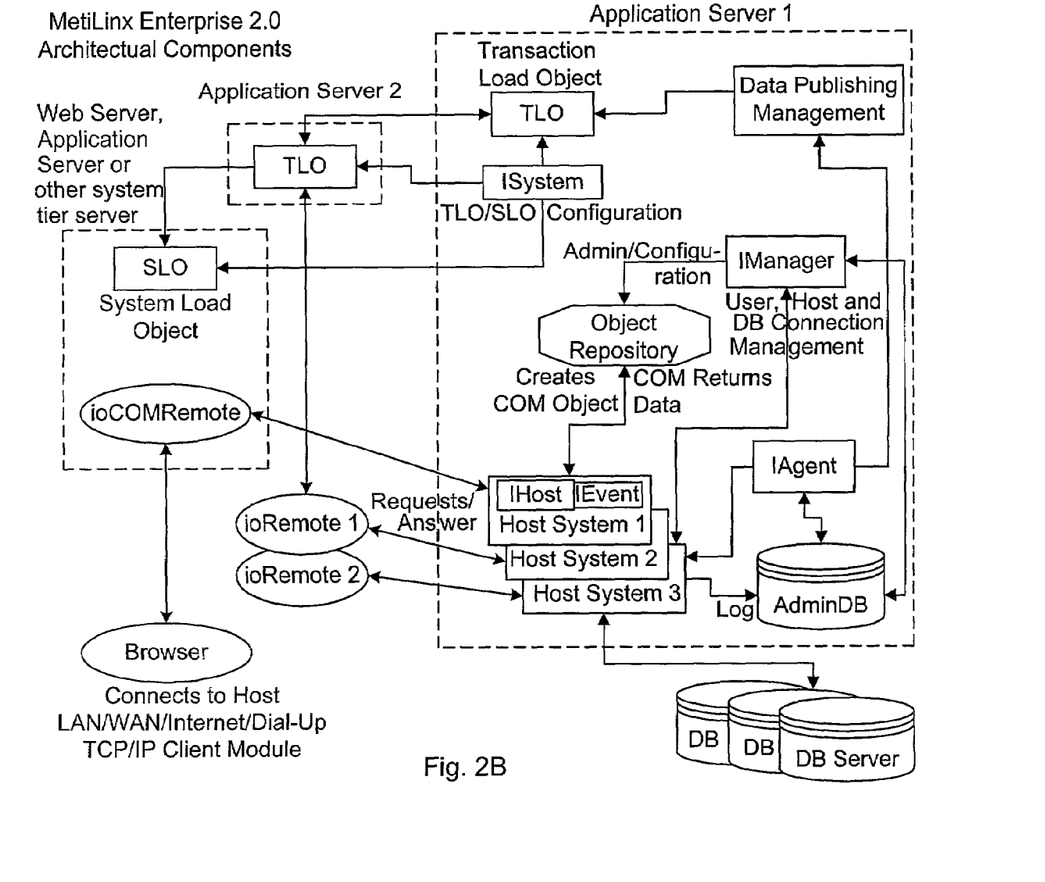
FIG. 2B illustrates architectural components of the present invention.
Figure 2C:
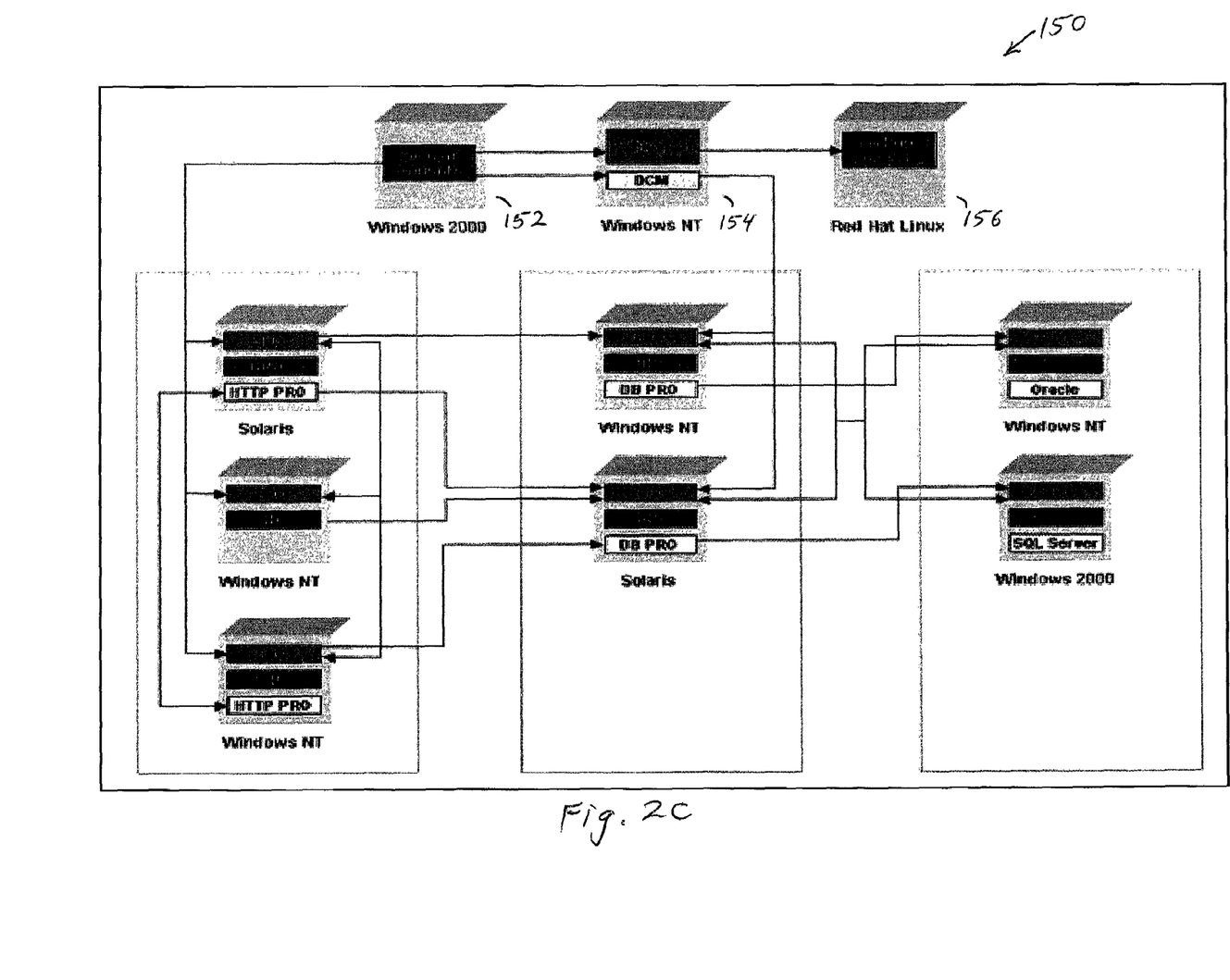
FIG. 2C illustrates a network system with multiple platforms.

FIG. 2B illustrates one possible arrangement of more specific components of the present invention. Note that the term "component" as used in this specification includes any type of processing device, hardware or software that may exist within, or may be executed by, a digital processor or system.

Figure 1B:
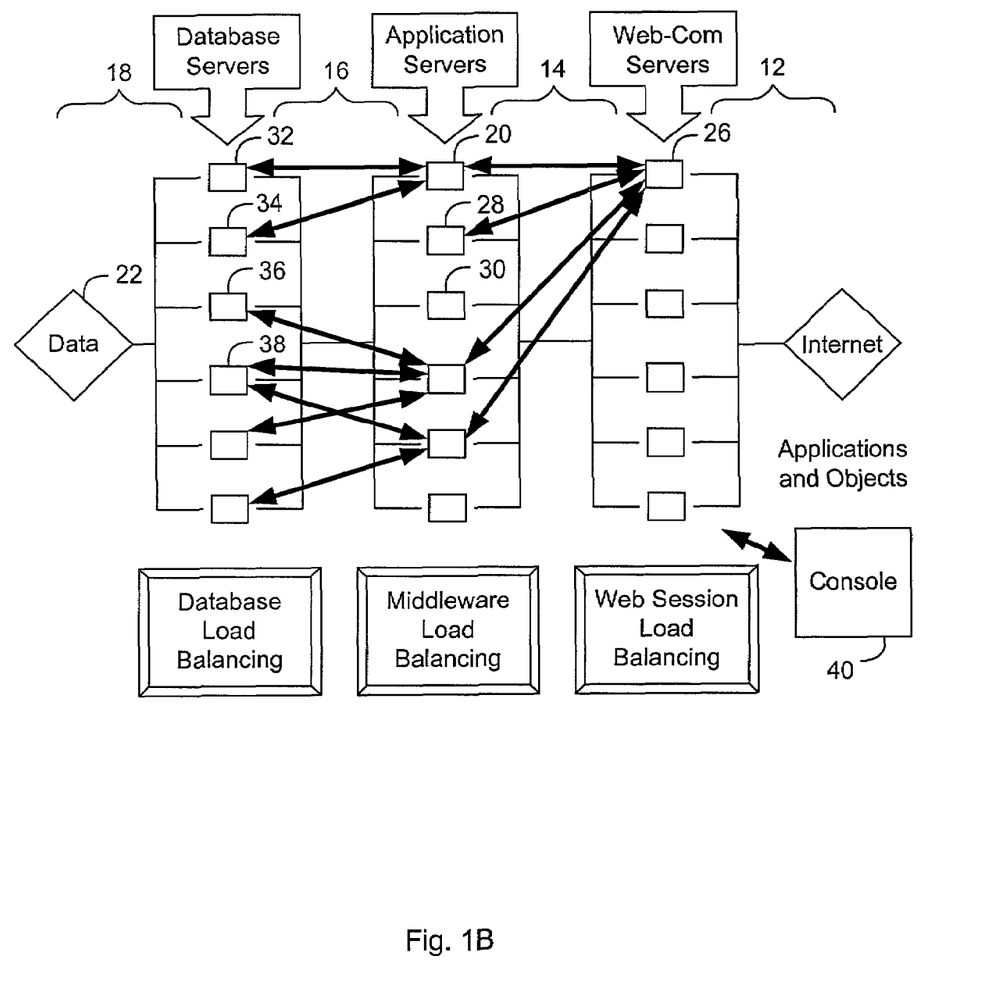
FIG. 1B shows network performance measured according to the present invention.

Systems such as those illustrated in FIGS. 1, 2A and 2B, along with virtually any type of networked system, can be provided with IOs. In a preferred embodiment, the IOs are installed on each server in the network in a distributed peer-to-peer architecture. The IOs measure real-time behavior of the servers components, resources, etc. to achieve an overall measure of the behavior and performance of the network.

A software system for populating a network with nodes, and for monitoring, analyzing, managing and optimizing a network is provided in the co-pending applications cited above.

A preferred embodiment collects data on low-level system and network parameters such as CPU utilization, network utilization, latency, etc. About 400 different measured characteristics are used. Table I, below, lists some of the characteristics that are monitored in the preferred embodiment.

BEGIN TABLE I

SYSTEM

File Read Operations/sec
File Write Operations/sec
File Control Operations/sec
File Control Operations/sec
File Write Bytes/sec
File Control Bytes/sec
Context Switches/sec
System Calls/sec
% Total Processor Time
% Total User Time
% Total Privileged Time
Total Interrupts/sec
System Up Time
Alignment Fixups/sec
Exception Dispatches/sec
Floating Emulations/sec
% Total DPC Time
% Total Interrupt Time
Total DPCs Queued/sec
Total DPC Rate
Total DPC Bypasses/sec
Total APC Bypasses/sec
% Registry Quota In Use

PROCESSOR

% Processor Time
% User Time
% Privileged Time
% DPC Time
% Interrupt Time
Interrupts/sec -continued

BEGIN TABLE I

DPCs Queued/sec
DPC Rate
DPC Bypasses/sec
APC Bypasses/sec
MEMORY

Available Bytes
Committed Bytes
Commit Limit
Write Copies/sec
Transition Faults/sec
Cache Faults/sec
Demand Zero Faults/sec
Pages/sec
Pages Input/sec
Page Reads/sec
Pages Output/sec
Page Writes/sec
Pool Paged Bytes
Pool Nonpaged Bytes
Pool Paged Allocs
Pool Nonpaged Allocs
Free System Page Table Entries
Cache Bytes
Cache Bytes Peak
Pool Paged Resident Bytes
System Code Total Bytes
System Code Resident Bytes
System Driver Total Bytes
System Driver Resident Bytes
System Cache Resident Bytes
% Committed Bytes In Use
% Committed Bytes In Use
PHYSICAL DISK Current Disk Queue Length
% Disk Time
Avg. Disk Queue Length
% Disk Read Time
Avg. Disk Read Queue Length
% Disk Write Time
Avg. Disk Write Queue Length
Avg. Disk sec/Transfer
Avg. Disk sec/Read
Avg. Disk sec/Write
Disk Transfers/sec
Disk Reads/sec
Disk Writes/sec
Disk Bytes/sec
Disk Read Bytes/sec
Disk Write Bytes/sec
Avg. Disk Bytes/Transfer
Avg. Disk Bytes/Read
Avg. Disk Bytes/Write
LOGICAL DISK % Free Space
Free Megabytes
Current Disk Queue Length
% Disk Time
Avg. Disk Queue Length
% Disk Read Time
Avg. Disk Read Queue Length
% Disk Write Time
Avg. Disk Write Queue Length
Avg. Disk sec/Transfer
Avg. Disk sec/Read
Avg. Disk sec/Write
Disk Transfers/sec
Disk Reads/sec
Disk Writes/sec
Disk Bytes/sec
Disk Read Bytes/sec
Disk Write Bytes/sec
Avg. Disk Bytes/Transfer -continued

BEGIN TABLE I

THREADS

% Processor Time
% User Time
% Privileged Time
Context Switches/sec
Elapsed Time
Priority Current
Priority Base
Start Address
Thread State
Thread Wait Reason
ID Process
ID Thread
OBJECTS Processes
Threads
Events
Semaphores
Mutexes
Sections
SERVER Bytes Total/sec
Bytes Received/sec
Bytes Transmitted/sec
Sessions Timed Out
Sessions Errored Out
Sessions Logged Off
Sessions Forced Off
Errors Logon
Errors Access Permissions
Errors Granted Access
Errors System
Blocking Requests Rejected
Work Item Shortages
Files Opened Total
Files Open
Server Sessions
File Directory Searches
Pool Nonpaged Bytes
Pool Nonpaged Failures
Pool Nonpaged Peak
Pool Paged Bytes
Pool Paged Failures
Pool Paged Peak
Context Blocks Queued/sec
Logon/sec
Logon Total
SERVER WORK QUEUES Queue Length
Active Threads
Available Threads
Available Work Items
Borrowed Work Items
Work Item Shortages
Current Clients
Bytes Received/sec
Bytes Sent/sec
Bytes Transferred/sec
Read Operations/sec
Read Bytes/sec
Write Operations/sec
Write Bytes/sec
Total Bytes/sec
Total Operations/sec
Context Blocks Queued/sec
CPU PERFORMANCE processor ID
minor faults
major faults
inter-processor cross-calls
interrupts
interrupts as threads

BEGIN TABLE I context switches
involuntary context switches
thread migrations
spins on mutexes
spins on readers/writer locks
system calls
percent user time
percent system time
percent wait time
percent idle time
processor set membership of the CPU
read() + readv() system calls
write() + writev() system calls
forks
vforks
execs
bytes read by rdwr()
bytes written by rdwr()
terminal input characters
chars handled in canonical mode
terminal output characters
msg count (msgrcv() + msgsnd() calls)

CPU PERFORMANCE semaphore ops count (semop () calls)
pathname lookups
ufs_iget() calls
directory blocks read
inodes taken with attached pages
inodes taken with no attached pages
inode table overflows
file table overflows
proc table overflows
interrupts as threads (below clock)
intrs blkd(swtch)
times idle thread scheduled
involuntary context switches
thread_create()s
cpu migrations by threads
xcalls to other cpus
failed mutex enters (adaptive)
rw reader failures
rw writer failures
times loadable module loaded
times loadable module unloaded
physical block writes (async)
tries to acquire rw lock
reg window user overflows
reg window user underflows
reg window system overflows
reg window system underflows
reg window system user overflows
procs waiting for block I/O
page reclaims (includes pageout)
page reclaims from free list
pageins
pages paged in
pageouts
pages paged out
swapins
pages swapped in
swapouts
pages swapped out
pages zero filled on demand
pages freed by daemon or auto
pages examined by pageout daemon
revolutions of the page daemon hand
minor page faults via hat_fault()
minor page faults via as_fault()
major page faults
copy-on-write faults
protection faults
faults due to software locking req
as_fault()s in kernel addr space
times pager scheduled
executable pages paged in
executable pages paged out
executable pages freed
anon pages paged in
anon pages paged out
anon pages freed
fs pages paged in
fs pages paged out
fs pages free

FILE SYSTEM file access system routines
buffer activity
data transfers per second
accesses of system buffers.
cache hit ratios
raw transfers
system calls
specific system calls.
characters transferred
block device activity
device load ratio
average wait time
average service time
physical block reads
physical block writes (sync + async)
logical block reads
logical block writes

KERNEL STATISTICS (KSTATS)

Interrupt statistics
Event timer statistics
I/O statistics

NETWORK

Packet log and description
RPC response time

VIRTUAL MEMORY processes in run queue
processes runnable but swapped
virtual and real memory.
swap space currently available
size of the free list
page faults and paging activity
page reclaims
minor faults
kilobytes paged in
kilobytes paged out
kilobytes freed
anticipated short-term memory shortfall
pages scanned by clock algorithm
disk operations per second
trap/interrupt rates (per second).
device interrupts
system calls
CPU context switches
percentage usage of CPU time
user time
system time
idle time
swap ins
swap outs
pages swapped in
pages swapped out

PROCESSES forks
vforks
lexecs
cpu context switches
device interrupts
traps
system calls
total name lookups
user cpu
system cpu
idle cpu
wait cpu -continued

BEGIN TABLE I process start time
usr + sys cpu time for this process
usr + sys cpu time for reaped children
priority
% of recent cpu time
% of system memory used by the process
CPU PERFORMANCE user time
system time
idle time
nice time
average load
number of processes
run queue length
VIRTUAL MEMORY pages swapped in
pages swapped out
Total amount of memory
Amount of memory in use
Currently unused real memory.
Total amount of shared memory
Memory used for buffers
Total swap space(s)
Used disk swap
Free swap space.
Cached memory
NETWORK For each interface:
Number of received packets from system boot.
Number of received mangled packets from system boot.
Number of received but dropped packets.
Number of received packet with framing error.
Number of transmitted packets.
Number of errors during transmitting. i.e. late detected collision.
Number of dropped packets.
Number of collisions during transmitting.
Number of carrier loses during transmitting.
Allocated buffers
Socket usage per protocol
Resource usage per protocol
Kernel ARP table
NETWORK network devices with statistics
Lists the Layer2 multicast groups a device is listening to (interface index, label, number of references, number of bound addresses).
number of pages that are 'code'
number of pages of data/stack
network device status
Firewall chain linkage
Firewall chains
Network statistics
Raw device statistics
Routing cache
Socket statistics
PROCESSES forks
cpu context switches
device interrupts
state (R, S, D, Z, T)
minor faults
major faults
timeslices
user mode jiffies
kernel mode jiffies
nice value
timeout jiffies
uptime jiffies
Virtual memory size.
Resident number of pages
total program size
size of in memory portions
number of the pages that are shared -continued

BEGIN TABLE I number of pages of library
number of dirty pages
PHYSICAL DISK

I/O statistics
Number of read requests to whole disk not only for partitions.
Number of write requests to whole disk.
Number of read blocks from whole disk.
Number of written blocks from whole disk.
LOGICAL DISK Busy time
Average queue length
Sectors read/written
Blocks read/written
Average waiting time
GENERAL SETS Local response process latency
Local resource access latency (physical and virtual memory, hdd, sockets, etc).
Spanned resource access latency (physical and virtual memory, hdd, sockets, etc). System process flow organized across functional groups
Single arc latency between nodes
Combined arc latency across subnet
Processor time slice assignments
Functional resource arc analysis in tier-specific evaluations of standard and native parameters (related to web servers, database servers and different app servers)
Functional resource arc analysis of harmonized Native Sensor Data and harmonized multi platform data
Application priorities
Transactional priorities

END TABLE I

Data is produced at each node as a four-byte value reflecting the characteristics of the host processing system for the node. These values are referred to as Local Node Values (LNVs). Multiple LNVs from different nodes are combined into a composite value called a Composite Node Value (CNV). CNVs can also include CNVs passed by other nodes.

The CNVs remain four-bytes in size. A CNV is passed along the network hierarchy and used to obtain further composite values by combining with a LNV at successive nodes so that overall system performance is ultimately provided in the composite values. Node value propagation is typically organized into organizational and functional blocks, as described in the related applications. Typically, node value propagation is in the direction of dependencies, or counter to request flow. However, since request flow and dependencies are loosely adhered to in any particular network (and can change with time) the system of the present invention can adapt to changing conditions. In general, the passing of node values can change dynamically, can be one-to-many or many-to-one and is bi-directional. Thus, unlike the limited directional "chaining" of prior art systems as shown in FIG. 1A, the system of the present invention can provide flexible peer-to-peer value passing. Performance and usage information from many nodes can be combined in varied patterns to achieve more versatile analysis structures such as that illustrated in FIG. 1B (by bold arrows).

Naturally, in other embodiments, the local and composite values can be of any size, varying sizes, etc. The values can be more complex data structures as opposed to "values." Any combination of network characteristics can be measured.

LNVs and CNVs are made up of four sub-values. Each sub-value is a byte of data with a higher value (e.g., 255)

indicating optimal functioning in the sub-value's associated network property. A first sub-value is a System Balance Value (SBV). The SBV measures the balanced operation of server nodes within functional groups. Functional groups are designated by a user/administrator and are used by the system of the present invention to define groups among which CNVs accumulate values. A higher SBV value indicates that functional groupings of server nodes are operating in good balance.

A second sub-value is the System Utilization Value (SUV). The SUV represents the system resource utilization, based on analyses of individual and aggregated resource nodes. A higher values indicates that resources are being utilized more efficiently.

A third sub-value is the Performance Optimization Value (POV). The POV represents the metric for speed or response of the system resources. A higher value means that response times are shorter, or that speed of response is higher.

A fourth, and final, sub-value is called the MetiLinx Optimization Value (MOV). The MOV indicates the degree of total system optimization. A high value indicates that functional groups are more optimally balanced. The MOV reflects the other sub-values of balance, resource utilization and speed of response.

In order to meaningfully composite LNV and CNV values received from other nodes, each node maintains a "correlation matrix." The correlation matrix includes numerical weighting factors based on differences in characteristics of different node environments in the network. For example, best performance values can be maintained for every node in the system. Node A might be recorded at a best performance combination of 90% utilization and a 3 second response. Node B might have a 90% utilization with a 2 second response. When node C receives LNV or CNV values indicating 90% utilization with a 3 second response for each node, node C is now aware that node A's host environment is operating at a high performance while node B's environment is operating at a lower than desired utilization since the response time is slower than previously achieved. In generating a CNV from node A and B values, node C's process combines the utilization and response times by weighting according to the correlation matrix. In this simplified example, if "A" is the dependency of node C on node A's utilization (for node C's efficient operation and utilization), while "B" is the dependency of node C on node B's utilization, then the CNV at node C can be computed as A+(B* 2)/3.

Each node's correlation matrix is updated based on information the node receives from other nodes. For example, if node C is informed that node B is now operating at 90% utilization with a 1 second response time, node C's correlation matrix factors with respect to node B are updated. Note that the correlation matrix is multi-dimensional. With the simplified example, alone, there can be a two dimensional array for utilization versus response time for each node.

In a preferred embodiment the correlation matrix is stored locally to the node process. Usually the correlation matrix resides in fast RAM in the node's host processing system. However, other embodiments can use variations on the correlation matrix and can maintain and access the correlation matrix in different ways. For example, correlation matrixes can be stored on, and accessed from, a central console computer.

Nodes may be removed from the network as, for example, when an administrator deactivates the node, the node's host processor is brought down, etc. When a node is brought down the optimization system traffic of the present invention is routed to different nodes. It is advantageous to transfer the correlation matrix of the node taken down to the one or more nodes to which traffic is being re-routed so that the information in the correlation matrix does not have to be recreated.

A preferred embodiment of the invention uses varying latency cycles to allow nodes to gather characteristics data to generate local values at varying frequencies. For example, a latency cycle can vary from 0 to 100. A larger number means that a characteristic is obtained less frequently. A value of 0 for a latency cycle means that a characteristic value is obtained as often as possible. Naturally, a lower latency cycle means that the host CPU is spending more time acquiring characteristic data and, possibly, generating values, also.

Although the present invention has been discussed with respect to specific embodiments, these embodiments are merely illustrative, and not restrictive, of the invention.

Thus, the scope of the invention is to be determined solely by the appended claims.

What is claimed is:

1. A computer implemented method for assessing computer server and communications network capacity, the method comprising:

calculating two integer values representing a Local Node Value (LNV) and a Composite Node Value (CNV);

calculating the LNV of a server as an integer value through a combination of measured counters at the same instantaneous point in time, the LNV reflecting the capacity of the server to receive work loads; and, calculating the CNV of a beginning server as an integer value through a combination of the LNVs of a sub-network of servers that begins with the beginning server, the calculation of the CNV including the LNV of the beginning server, the CNV reflecting the capacity of the sub-network beginning with the beginning server to collectively receive work-loads wherein said LNV and CNV allow a user to analyze network device performance and network resource utilization in a peer-to-peer, real-time relationship, without requiring a multi-tier polling data collection process via a central console, said peer-to-peer real-time relationship comprising a peer-to-peer value including said CNV and said LNV and capable of changing dynamically, in one to many, many to one, and bi-directional relationships between a plurality of calculated values wherein said CNV and LNV values are displayed in a client interface device and associated with a new network resource configuration wherein one or more network elements are communicatively coupled in a different manner from a previous network resource configuration.

2. The method in accordance with claim 1, further comprising:

obtaining a plurality of characteristics or counters at a specific point in time that are combined through correlation matrixes and weighted sums to produce the two integer values for the same point of time, the correlation matrixes and weighted sums being updated over a period of time to reflect historical changes over the period of time wherein an intelligent object (IO) is installed on each server in the network in a peer-to-peer architecture, said IO's measuring real-time behavior of network components.

3. A network performance aggregate resource analysis system comprising:
one or more processor readable storage devices having processor readable code embodied on said processor readable storage devices, said processor readable code for programming one or more processors to perform a method of providing a control function for a computer system, the method comprising: receiving a process code from a remote server; and operating the computer system according to the process code; to implement the method comprising the following steps:
providing one or more intelligence objects (IO) populating a network communicatively coupled to one or more nodes executing on one or more servers, computers, or other network components;
providing a composite value wherein said composite value is derived from said IO's;
providing one or more system level object's (SLO) that monitor and report on one or more network performance parameters in a host computer server;
providing one or more transaction level objects (TLO) that monitor transaction loads with respect to said host computer wherein said IO's are installed on each server in the network in a peer-to-peer network architecture, said IO's measuring real-time behavior of network components.

4. A network performance aggregate resource analysis system comprising: one or more processor readable storage devices having processor readable code embodied on said processor readable storage devices, said processor readable code for programming one or more processors to perform a method of providing a control function for a computer system; receiving a process code from the remote server; and operating the computer system according to the process code; to implement the method comprising the following steps:
providing one or more intelligence objects (IO) populating a network communicatively coupled to one or more nodes executing on one or more servers, computers, or other network components;
providing a composite value wherein said composite value is derived from said IO's;
providing one or more system level object's (SLO) that monitor and report on one or more network performance parameters in a host computer server;
providing one or more transaction level objects (TLO) that monitors transaction loads with respect to said host computer wherein said IO's are installed on each server in the network in a peer-to-peer network architecture, said IO's measuring real-time behavior of network components wherein said objects measure a plurality of network performance values;
representing said values in a binary value, said binary value represented in an initial local utilization value and subsequent local utilization values, said initial local utilization value relating only to said host computer server;
providing said localization values capable of being modified to a first composite utilization value;
providing said first composite utilization value capable of being passed directly to a second composite utilization value communicatively coupled to a data record tag;
providing a plurality of tags and segments to said first and second composite utilization values such that a plurality of local utilization values, composite utilization values and initial local utilization values differentiate host data in a bi-directional relationship.

5. A computer implemented method for assessing computer server and communications network capacity, said network having processor readable storage devices and processor readable code stored thereon for executing instructions on a processor, the method comprising:
calculating two integer values representing a Local Node Value (LNV) and a Composite Node Value (CNV), by;
calculating the LNV of a server as an integer value through a combination of measured counters at the same instantaneous point in time, the LNV reflecting the capacity of the server to receive work loads;
calculating the CNV of a beginning server as an integer value through a combination of the LNVs of a sub-network of servers that begins with the beginning server, the calculation of the CNV including the LNV of the beginning server, the CNV reflecting the capacity of the sub-network beginning with the beginning server to collectively receive work-loads wherein said LNV and CNV allow a user to analyze network device performance and network resource utilization in a peer-to-peer, real-time relationship, without requiring a multi-tier polling data collection process wherein said CNV and LNV values are displayed in a client interface device and associated with a new network resource configuration and wherein one or more network elements are communicatively coupled in a different manner from a previous network resource configuration.

6. A computer implemented method for assessing computer server and communications network capacity, said network having processor readable storage devices and processor readable code stored thereon for executing instructions on a processor, the method comprising:
calculating two integer values representing a Local Node Value (LNV) and a Composite Node Value (CNV), by;
calculating the LNV of a server as an integer value through a combination of measured counters at the same instantaneous point in time, the LNV reflecting the capacity of the server to receive work loads;
calculating the CNV of a beginning server as an integer value through a combination of the LNVs of a sub-network of servers that begins with the beginning server, the calculation of the CNV including the LNV of the beginning server, the CNV reflecting the capacity of the sub-network beginning with the beginning server to collectively receive work-loads wherein said LNV and CNV allow a user to analyze network device performance and network resource utilization in a peer-to-peer, real-time relationship, without requiring a multi-tier polling data collection process and capable of changing dynamically, in one to many, many to one, and bi-directional relationships between a plurality of calculated values wherein said CNV and LNV values are displayed in a client interface device and associated with a new network resource configuration and wherein one or more network elements are communicatively coupled in a different manner from a previous network resource configuration.

7. A computer implemented method for assessing computer server and communications network capacity, said network having processor readable storage devices and processor readable code stored thereon for executing instructions on a processor, the method comprising:
calculating two integer values representing a Local Node Value (LNV) and a Composite Node Value (CNV), by;
calculating the LNV of a server as an integer value through a combination of measured counters at the same instantaneous point in time, the LNV reflecting the capacity of the server to receive work loads;

calculating the CNV of a beginning server as an integer value through a combination of the LNVs of a sub-network of servers that begins with the beginning server, the calculation of the CNV including the LNV of the beginning server, the CNV reflecting the capacity of the sub-network beginning with the beginning server to collectively receive work-loads wherein said LNV and CNV allow a user to analyze network device performance and network resource utilization in a peer-to-peer, real-time relationship, without requiring a multi-tier polling data collection process via a central console, said peer-to-peer real-time relationship comprising a peer-to-peer value including said CNV and said LNV wherein said CNV and LNV values are displayed in a client interface device and associated with a new network resource configuration and wherein one or more network elements are communicatively coupled in a different manner from a previous network resource configuration.

* * * * *